(12) United States Patent
Henderer et al.

(10) Patent No.: US 7,207,867 B2
(45) Date of Patent: Apr. 24, 2007

(54) PRECISION CEMENTED CARBIDE THREADING TAP

(75) Inventors: Willard E. Henderer, Evans, GA (US); Sadayuki Akaki, Fukushima (JP)

(73) Assignees: Kennametal Inc., Latrobe, PA (US); Yamawa Mfg. Co., Ltd., Fukushima (JP)

( * ) Notice: Subject to any disclaimer, the term of this patent is extended or adjusted under 35 U.S.C. 154(b) by 127 days.

(21) Appl. No.: 11/108,405

(22) Filed: Apr. 18, 2005

(65) Prior Publication Data

US 2005/0187026 A1 Aug. 25, 2005

Related U.S. Application Data

(62) Division of application No. 10/375,730, filed on Feb. 27, 2003, now Pat. No. 7,147,413.

(51) Int. Cl.
*B24B 1/00* (2006.01)
(52) U.S. Cl. .......................................... 451/48; 451/47
(58) Field of Classification Search .................. 451/48, 451/47, 114–118, 147, 148, 237–240, 281; 76/102, 107.1, 108.1; 409/66
See application file for complete search history.

(56) References Cited

U.S. PATENT DOCUMENTS

| | | | |
|---|---|---|---|
| 2,290,175 A | 7/1942 | Gade | |
| 2,574,016 A | 11/1951 | Burg | |
| 4,028,763 A | 6/1977 | Jenner | |
| 4,879,660 A | 11/1989 | Asakura et al. | |
| 5,487,626 A | 1/1996 | Von Holst et al. | |
| 5,664,915 A * | 9/1997 | Hawke | 408/222 |
| 5,701,578 A | 12/1997 | Liu | |
| 5,725,336 A * | 3/1998 | Vilmanyi et al. | 408/219 |
| 6,213,693 B1 * | 4/2001 | Kato | 408/222 |
| 6,293,740 B1 | 9/2001 | Schulte | |
| 6,338,879 B1 | 1/2002 | Yasuoka | |
| 6,386,954 B2 * | 5/2002 | Sawabe et al. | 451/48 |
| 6,499,920 B2 * | 12/2002 | Sawabe | 408/222 |

(Continued)

FOREIGN PATENT DOCUMENTS

| | | |
|---|---|---|
| DE | 2517795 | 11/1976 |
| JP | 4-348813 | 12/1992 |
| JP | 11-221716 | 8/1999 |

OTHER PUBLICATIONS

American National Standard, A.S.M.E. B94.9-1999, "Taps: Ground and Cut Threads (Inch and Metric Sizes)," Jan. 21, 2000, (p. 39) 3 pages.

(Continued)

*Primary Examiner*—Dung Van Nguyen
(74) *Attorney, Agent, or Firm*—Larry R. Meenan

(57) ABSTRACT

A precision cemented carbide threading tap is designed for use in precision tool holders in synchronous high speed tapping. The precision tap includes a fully cylindrical shank without the aid of squares, flats or other notches. The precision tap further includes a threaded body portion and a threaded cutting chamfer portion. The threaded body portion and the threaded cutting chamfer portion of the precision tap are concentric to the cylindrical shank of the tap within a runout of 10 microns. The precision cemented carbide threading tap improves the accuracy, life and speed by which internal screw threads are produced.

15 Claims, 1 Drawing Sheet

U.S. PATENT DOCUMENTS

| | | |
|---|---|---|
| 6,858,333 B2 | 2/2005 | Henderer |
| 2002/0001717 A1 | 1/2002 | Hanyu |
| 2003/0049083 A1 | 3/2003 | Ohtani et al. |

OTHER PUBLICATIONS

Deutsche Normen DIN 7160, ISO Allowances for External Dimensions (Shafts), Aug. 1965, 2 pages.

Huntress Ed, "Heat-Shrink Tooling Gets Factory-Wide Application," Machine Shop Guide, Oct. 2001, pp. 46-48 (3 pages).

International Preliminary Report on Patentability (Form PCT/IPEA/416) of Kennametal Inc. International Patent Application No. PCT/US04/04657, international filing date Feb. 18, 2004, date of mailing Nov. 25, 2005.

* cited by examiner

PRECISION CEMENTED CARBIDE THREADING TAP

This application is a divisional of application Ser. No. 10/375,730, filed Feb. 27, 2003, now U.S. Pat. No. 7,147,413 the entire contents of which are incorporated herein by reference.

BACKGROUND OF THE INVENTION

1. Field of the Invention

This invention relates to cutting tools. More particularly, this invention relates to a precision cemented carbide threading tap for creating internal screw threads in machinable metallic and non-metallic materials.

2. Description of the Related Art

Mechanisms and machine components requiring screw threads have a long history in technology. Specifically, the application of screw threads as fastener components dominates over all other means to join parts into assemblies. Although there are many ways to generate screw threads both internal as well as external, experience has shown that taps are the favored means to generate the internal screw thread. There currently exist two tapping methods to generate internal screw threads. The dominant tapping method is by cutting and removing material from the walls of a hole to produce a helical V-shaped screw thread. Alternatively, internal screw threads can be created by displacing material to form an internal screw thread.

The dimensional accuracy of the shape and size of the internal screw thread controls the precision and fit of the screw thread assembly. Additionally, the speed of tapping controls the cost to produce an internal screw thread. During the manufacturing of threaded holes, taps have been historically driven by drill presses or machine tools equipped with flexible tapping heads that allow the tap to rotate and feed at a rate that approximates the desired lead of the internal screw thread. Because the machine's feed is only approximate, the generated screw thread lead is controlled by the tap's lead, with the difference between the machine's feed and the tap lead accommodated by the flexible tapping head. Not only is accuracy affected by flexible tapping heads, but also the rate at which they can rotate is limited. Additionally, tapping heads allow the tap to run out radially during cutting, further limiting the accuracy of the screw thread as it is generated.

Recently machine tools have been improved by CNC controls such that the rotation and feed of the spindle holding the tap could be accurately synchronized (for example U.S. Pat. No. 4,879,660, the entire contents of which are herein incorporated by reference), thereby eliminating the need for flexible tapping heads. Additionally, the means of holding other rotating shank type tools, such as drills and end mills, has been improved by holders that can be first thermally expanded then shrunk by cooling to fit the tools shank. Alternatively, holders have been developed that hold the tool's shank by hydraulic pressure. Both shrink fit and hydraulic holders allow the tool to be rotated with far less radial run out than is possible by tapping heads; for example the holder can be rotated concentrically within 3 micrometers or less. Further, these methods can hold a cylindrical shank with much higher gripping force and rigidity. Reduced radial run out and greater rigidity enable the use of carbide cylindrical cutting tools that can be used at far greater cutting speeds than similar tools manufactured from tool steel.

Taps have been recently been redesigned and constructed to allow use of shrink fit and hydraulic holders in the same manner as other rotating shank type tools, such as drills and end mills. Designed for use in these tool holders, taps are now available with fully cylindrical shanks without the aid of squares as with older designs, nor with other flats or other notches. However, taps are not currently manufactured with a cylindrical shank of sufficient accuracy (diameter and roundness) to allow the full use of shrink fit and hydraulic holders. Reference can be made to American National Standard, A.S.M.E. B94.9-1999 for design and tolerance of currently known taps. Considering, for example a 12 mm tap manufactured to B94.9, the tolerance of the shank diameter is +0.0000, −0.0015 inch (38 micrometers). No limits are given by B94.9 for the roundness of the shank, the requirement is the eccentricity must be no more than 0.0008 inch (20 micrometers) for the shank and major diameter, and 0.0015 inch (38 micrometers) for the chamfered cutting edges, respectively, when these features are measured to the centers on which the tap is held during manufacturing. There is no direct relationship of the concentricity of the thread diameter and the chamfered cutting edges to the tap's shank. In order to allow effective use of shrink fit and hydraulic holders for taps, the diameter of the shank must be to h6 of DIN standard 7160 which requires, for example, the shank of a 12 mm tap to have a diameter tolerance of +0, −11 micrometers (+0, −0.0004 inch) of the nominal diameter and the roundness be 3 microns (0.00012 inch) or less.

Runout is defined as the radial variation from a true circle that lies in a diametric plane and is concentric with the tool axis. In practice, runout is typically measured with a device such as a dial indicator, mounted at right angles to the axis of a cylinder, and expressed as total indicator variation (tiv). Eccentricity is defined as one-half the runout or total indicator variation. Because taps are held by the shank during use, the runout of the threaded cutting portions of the tap can be most effectively measured by precisely holding the tap by the shank and measuring the runout as the tap is rotated.

Cemented tungsten carbide is favored as a material for manufacturing cutting tools over tool steels such as high-speed steel owing to properties such as higher hardness and high temperature stability including the ability to retain hardness at high temperatures. Typically, cutting tools manufactured from cemented carbide can be used a cutting speeds that are at least three times higher than tools manufactured from "high-speed" steel and the life of the tool is longer. However, cemented tungsten carbide has lower fracture toughness and strength than tool steel and this limits its use to machining operations where the cutting tool can be stiffly held. Without an improvement in concentricity of the tap of current technology, taps manufactured from cemented carbide only have very limited use, even with the aid of shrink fit and hydraulic holders. When carbide taps of current concentricity are used, cutting edges can chip or fracture easily rendering the tool useless. Additionally, the speed with which such taps can be used will be limited because the runout of the taps will increase as the rotational speed of the taps increases.

SUMMARY OF THE INVENTION

Briefly, according to this invention, there is provided a precision cemented carbide tap that includes a fully cylindrical shank and whose threaded body and cutting chamfer is concentric to the shank within 10 microns, thereby improving the accuracy and speed by which internal screw threads are produced.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
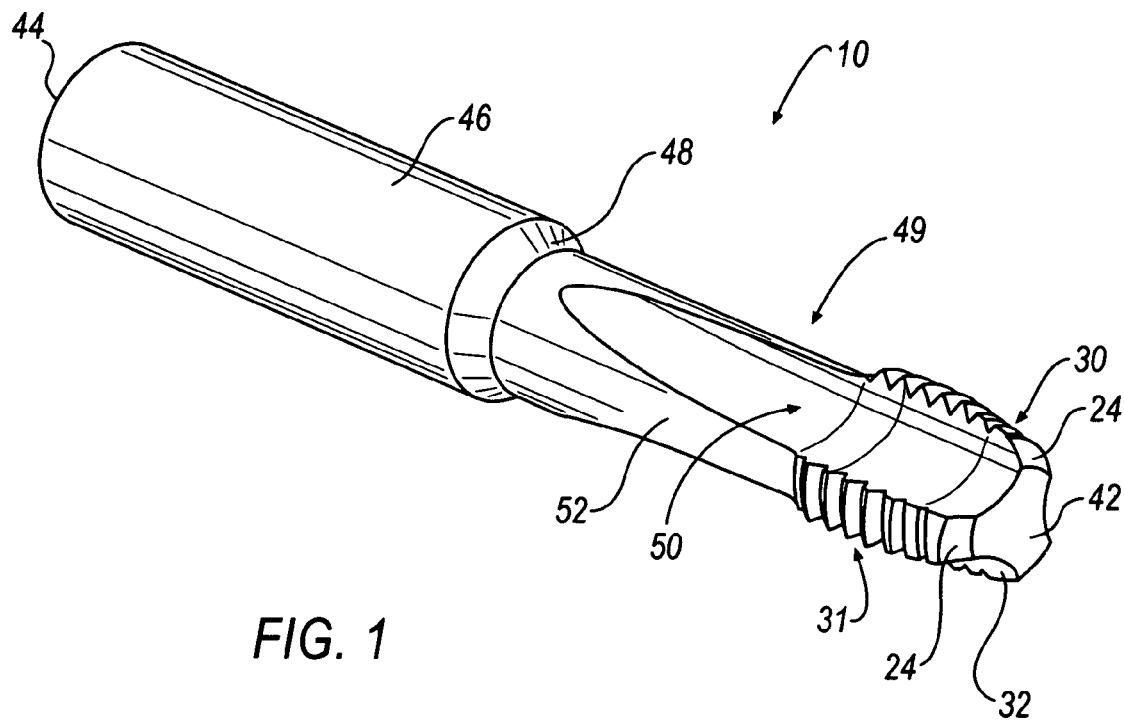
FIG. 1 is a perspective view of the a precision cemented carbide threading tap according to an embodiment of the invention.
Figure 2:
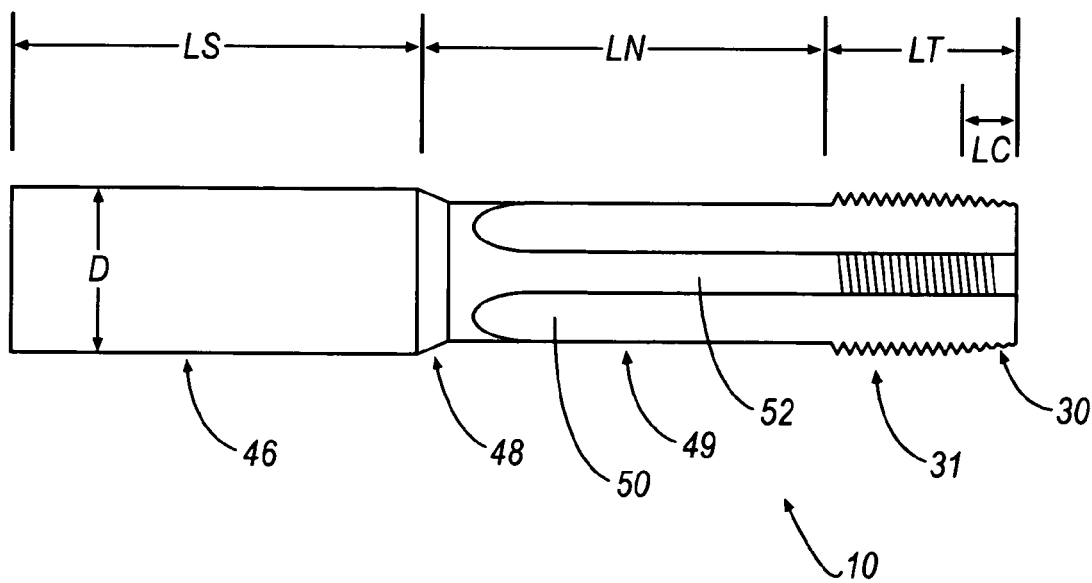
FIG. 2 is a side view of the precision cemented carbide threading tap of FIG. 1.

Referring now to FIGS. 1 and 2, a precision cemented carbide threading tap, shown generally at 10, is illustrated according to an embodiment of the invention. The tap 10 is manufactured from a cylindrical sintered tungsten carbide blank, frequently referred to as a substrate. The blank has a diameter that is sized larger than the finished dimensions of the tap 10 and is cut to length on surfaces 42 and 44.

A typical material for the substrate is metal carbide(s) cemented with cobalt. Although the main carbide constituent is tungsten carbide, other carbides may be used such as tantalum carbide, titanium carbide and niobium carbide. In addition, small amount of transition metal carbides may be added to restrain grain growth, and the substrate may also contain small amount of inevitable impurities.

The first step in processing the substrate is to grind the blank to precision cylindrical tolerances by methods such as cylindrical traverse grinding on centers or by centerless infeed grinding methods. During this step, a cylindrical shank 46 is ground to size at the axially rearward end of the tap 10 without squares, flats or other notches, and the major diameter of a threaded body portion 31 is formed at the axially forward end of the tap 10. The surface of the cylindrical shank 46 is ground to the diameter tolerances h6 stated in Deutsche Normen DIN 7160 and with roundness of 3 microns or less. Additionally during this process, or as a consequence of an additional process, an optional neck portion 49 may be created with a cylindrical surface 52, and a bevel 48 between the cylindrical shank 46 and the neck portion 49. Additionally, an optional bevel 24 may be ground by cylindrical grinding. In general, the shank diameter, D, is approximately equal to the nominal thread diameter, but the shank diameter may be smaller than the nominal thread diameter for large diameter taps, and alternatively larger for small diameter taps.

One aspect of the invention is that the blank is then held by the precision ground shank 46 by precision hydraulic holders during grinding in order to insure that a threaded body portion 52 and a threaded cutting chamfer portion 30 are concentric to the cylindrical shank 46 within a runout of 10 microns.

In the next step, one or more flutes 50 are ground so as to provide cutting edges, in combination with the threaded cutting chamfer portion 30, and a means for evacuating chips that form when the tap is used. As illustrated in FIG. 1, the flutes 50 are straight and generally oriented parallel to the axis of the tap 10. It should be realized that other flute orientations are possible. For example, short flutes may be ground at a 5 to 20 degree angle to the longitudinal axis of the tap 10 at the entry section of the tap in order to force the chip ahead of the motion of the tap during use. Alternatively, the flutes 50 may be helical, the helical rotation selected according to whether it is desirable to pull chips out of the hole or push chips ahead of the motion of the tap during use.

In the next step, the threaded body portion 31 is ground to form V-shaped thread flank surfaces, along with minor and major diameters, on a helix. Subsequently, the shape of a threaded cutting chamfer portion 30 is formed by grinding. The V-shaped thread flank surfaces and major diameter replicate the internal screw thread that is generated during tapping. The threaded cutting chamfer portion 30 is tapered so as to allow entry in the hole to be tapped.

As a final step in the process, the tap 10 may be optionally coated with a wear resistant layer (not shown) of metal nitrides, carbides, carbonitrides, borides and/or oxides, wherein the metal is chosen from one or more of the following: aluminum, silicon and the transition metals from Groups IVa, Va, and VIa of the Periodic Chart. This layer is deposited as a single monolayer or in multiple, including alternating, layers.

As a further option, the optional wear resistant layer may be coated with a second outer friction reducing layer (not shown) comprised of molybdenum disulphide; molybdenum disulphide and transition metals carbon; carbon and transition metal carbides; carbon and a transition metal; carbon; and carbon nitride. The outer layer is deposited as a single monolayer or in multiple layers, including alternating layers. Coating of the tap 10 with the optional wear resistant layer and the outer friction reducing layer is described in copending U.S. patent application Ser. No. 10/375,299, entitled "Coated Carbide Tap" (KG-1981), the entire contents of which are incorporated herein by reference.

Both the wear resistant layer and the outer friction reducing layer may be applied by use of a vapor deposition technique such as one of the well known physical vapor deposition (PVD) techniques, for example, any high ion density process such as, ion plating, magnetron sputtering, arc evaporation, or the like, or a chemical vapor deposition (CVD) technique by use of a variety of CVD processes that would achieve a satisfactory CVD layer. A hot filament CVD process may be used to apply diamond coatings.

Alternatively, the precision cemented carbide threading tap 10 with the fully cylindrical shank 46 may be coated with diamond and/or diamond-like carbon coatings in a manner similar to the wear resistant layer for use in tapping non-ferrous materials, such as aluminum that contains silicon.

The precision cemented carbide threading tap 10 is represented as a side view in FIG. 2. Shown at the left in FIG. 2 is the shank 46 having a diameter, D, and length LS. Shown at the right in FIG. 2 is the threaded body portion 31 having a length, LT, and including the tapered cutting chamfer portion 30 having a length, LC. An optional characteristic of the tap 10 is that it may contain the neck portion 49 of reduced diameter over the length, LN. During tapping, the tap 10 enters the hole to be threaded by the tapered cutting chamfer portion 30.

The above description characterizes the processing to arrive at the precision cemented carbide tap 10 of FIG. 1 in a certain number of basic steps. However, it should be appreciated that the processing may take any number of suitable steps. The use of the above-described basic steps is for ease of description. Thus, the scope of the invention is not limited to the specific processing steps set forth above.

An aspect of the precision tap 10 of the invention is that the threaded body portion 31 and the threaded cutting chamfer portion 30 are concentric to the cylindrical shank 46 within a runout of 10 microns, such that when the tap 10 is held by precision tap holders (not shown) during use, the threaded body portion 31 and the threaded cutting chamfer portion 30 of the tap 10 may be rotated by synchronous tapping machines (not shown) with combined runout that is so minimal that the runout does not affect the accuracy of the threaded hole nor the speed by which the tap 10 may be used.

Tests were conducted to prove the cutting effectiveness of the precision cemented carbide threading tap 40 of the invention. In one test, a M12×1.25 mm pitch precision cemented carbide threading tap was tested by tapping 33 HRC AISI 4340 steel at 300 feet/minute on a synchronous tapping machine. The precision tap tapped 1686 holes of acceptable gauging quality with little wear, whereas a TiN coated HSS tap manufactured to A.S.M.E. B94.9-1999 could only produce 158 holes of acceptable quality. Only at a reduced speed of 50 feet/minute could the conventional tap produce a comparable number of threaded holes.

In another test of the M12×1.25 precision cemented carbide threading tap of the invention, we found that the precision tap could be used at 80 meters/minute when tapping JIS SCM440 steel. With conventional taps, tapping JIS SCM440 steel is recommended at only 14 meters/minute. In both tests, we found the quality of internal screw threads generated by the invented tap could be maintained even at these high tapping speeds.

The results of the tests indicate that the precision tap of the invention has numerous advantages over existing tap technology by improving the accuracy and speed by which internal screw threads can be produced. In addition, the precision tap of the invention with a cylindrical shank produced to an improved diameter tolerance allows the effective use of precision shrink fit and hydraulic holders on CNC machine tools with tapping spindles that synchronize the rotation and feed accurately to the tap's lead. The accuracy of internal screw threads is improved when the invented tap is used with these precision holders. Further, a tap manufactured from cemented carbide taps with low small amounts of runout between the cutting body and the shank may be used with dramatically improved cutting speeds.

The documents, patents and patent applications referred to herein are hereby incorporated by reference.

While the invention has been specifically described in connection with various embodiments thereof, it is to be understood that this is by way of illustration and not of limitation, and the scope of the appended claims should be construed as broadly as the prior art will permit.

What is claimed is:

1. A method of manufacturing a precision threading tap, comprising the steps of:

grinding a blank to form a cylindrical shank to a predetermined diameter tolerance;

holding the cylindrical shank by precision hydraulic holder; and grinding the blank to form a threaded body portion and a threaded cutting chamfer portion, whereby the threaded body portion and the threaded cutting chamfer portion are ground concentric to the cylindrical shank of the tap within 10 micrometers.

2. A method according to claim 1, further comprising the step of coating the precision tap with a wear resistant layer of metal nitrides, carbides, carbonitrides, borides and/or oxides, and wherein the metal is chosen from one or more of the following: aluminum, silicon and the transition metals from Groups IVa, Va, and VIa of the Periodic Chart.

3. The method according to claim 2, wherein the wear resistant layer is deposited as a single layer or in multiple layers.

4. The method according to claim 2, further comprising the step of applying a second, outer layer to the first layer for reducing friction.

5. The method according to claim 4, wherein the outer layer is comprised of molybdenum disulphide; molybdenum disulphide and transition metals, or any combination thereof.

6. The method according to claim 4, wherein the outer layer is comprised of carbon, carbon and transition metal carbides, or any combination thereof.

7. The method according to claim 4, wherein the outer layer is comprised of carbon and a transition metal, or any combination thereof.

8. The method according to claim 1, wherein the predetermined diameter tolerance is in accordance with h6 of DTN standard 7160.

9. The method according to claim 1, wherein the cylindrical shank is formed without squares, flats or other notches.

10. The method according to claim 1, wherein the blank is made of sintered tungsten carbide material.

11. The method according to claim 1, wherein the blank is made of high speed steel.

12. The method according to claim 1, further comprising the step of grinding one or more flutes at an angle with respect to a longitudinal axis of the tap.

13. The method according to claim 12, wherein the one or more flutes are ground generally parallel with respect to the longitudinal axis of the tap.

14. The method according to claim 12, wherein the angle is between 5 and 20 degrees.

15. The method according to claim 12, wherein the one or more flutes are helical.

* * * * *